A. SCHOENHUT.
Children's Sleds.
No. 157,639.
Patented Dec. 8, 1874.
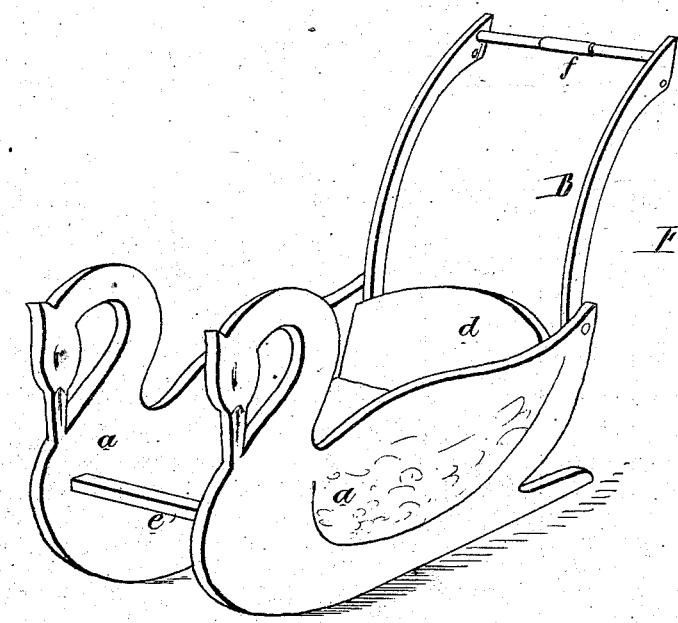
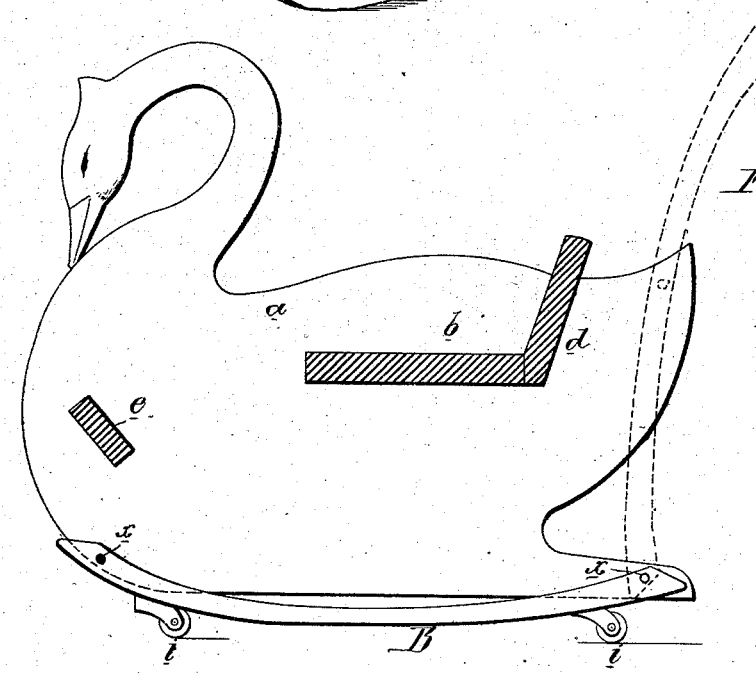

UNITED STATES PATENT OFFICE.

ALBERT SCHOENHUT, OF PHILADELPHIA, PENNSYLVANIA.

IMPROVEMENT IN CHILDREN'S SLEDS.

Specification forming part of Letters Patent No. 157,639, dated December 8, 1874; application filed November 3, 1874.

*To all whom it may concern:*

Be it known that I, ALBERT SCHOENHUT, of Philadelphia, Pennsylvania, have invented certain Improvements in Children's Sleds, of which the following is a specification:

The object of my invention is to so construct a child's sled that it can be used both out of doors as a sled, or indoors either as a rocking-chair or carriage; and this object I attain in the manner which I will now proceed to describe, referring to the accompanying drawings, in which—

Figure 1 is a perspective view of my improved sled, and Fig. 2 a vertical section of the same.

The opposite sides $a\ a$ of the sled are, in the present instance, made in the shape of swans, the curved necks of which impart an ornamental finish to the said sides. Extending across from side to side of the sled is a seat, $b$, having a back, $d$, and both seat and back may be upholstered in any suitable manner. A foot-rest, $e$, is arranged at a convenient distance from the seat $b$. To each side $a$ of the sled, near the lower edge of the same, I attach a curved bar, B, which, when turned down to the position shown in Fig. 2 and secured at the points $x\ x$, transforms the sled into a rocking-chair or cradle. These curved bars are connected together at the opposite ends by cross-pieces $f$, and, when adjusted to the position shown in Fig. 1, or in dotted lines in Fig. 2, serve as a convenient handle by which the sled may be propelled over the surface of the snow.

When it is desirable to use the sled indoors I attach to the bottom of each side of the same two casters, $i\ i$, which allow the sled to be readily moved over the floor of a room.

Inasmuch as a side for a sled having the form of a swan constitutes a separate application for Letters Patent for a design, I make no claim to it here; but

I claim as my invention—

The combination of the opposite sides $a\ a$ of the sled and seat $b$ with the connected curved bars B B, all substantially as and for the purpose set forth.

In testimony whereof I have signed my name to this specification in the presence of two subscribing witnesses.

ALBERT SCHOENHUT.

Witnesses:
HUBERT HOWSON,
HARRY SMITH.